(12) United States Patent
Hattori

(10) Patent No.: US 8,051,070 B2
(45) Date of Patent: Nov. 1, 2011

(54) DEVICE, METHOD, AND COMPUTER-READABLE RECORDING MEDIUM FOR NOTIFYING CONTENT SCENE APPEARANCE

(75) Inventor: Masakazu Hattori, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 487 days.

(21) Appl. No.: 12/212,749

(22) Filed: Sep. 18, 2008

(65) Prior Publication Data
US 2009/0132544 A1 May 21, 2009

(30) Foreign Application Priority Data

Oct. 26, 2007 (JP) .................................. 2007-278604

(51) Int. Cl.
*G06F 17/30* (2006.01)
(52) U.S. Cl. ........ 707/719; 707/718; 707/720; 707/770; 707/771
(58) Field of Classification Search .......... 707/718–720, 707/759, 760, 764, 770, 771
See application file for complete search history.

(56) References Cited

U.S. PATENT DOCUMENTS

| 7,668,806 | B2 * | 2/2010 | Liu et al. ................ 707/999.003 |
| 2004/0220946 | A1 * | 11/2004 | Krishnaprasad et al. ..... 707/100 |
| 2005/0038831 | A1 * | 2/2005 | Souder et al. ................ 707/201 |
| 2006/0031204 | A1 * | 2/2006 | Liu et al. .......................... 707/3 |

OTHER PUBLICATIONS

Re, et al., Distributed XQuery, 11 Web, 2004.
Fernandez, et al., Highly Distributed XQuery with DXQ, SIGMOD, 2007.

* cited by examiner

*Primary Examiner* — Debbie Le
(74) *Attorney, Agent, or Firm* — Turocy & Watson, LLP

(57) ABSTRACT

An acquiring unit acquires from each of a plurality of database servers processing capacity information for a query received from a client. A generating unit generates a first code indicating a first processing and a second code indicating a second processing for the query. A first transmitting unit transmits the first code to the database servers. An executing unit executes the second processing by using first result data of XML data acquired by executing the first processing from the database servers. A second transmitting unit transmits second result data of XML data acquired by executing the second processing to the client.

7 Claims, 14 Drawing Sheets

FIG.3

```
<paper>
  <title>XML </title>
  <body>
    <P>XML IS ... </P>
    <keyword>
       MARKUP LANGUAGE
    </keyword>
  </body>
</paper>
```

```
<paper>
  <title>XML DATABASE</title>
  <body>
    <P>XML IS ... </P>
    <P>STRUCTURIZATION ... </P>
  </body>
</paper>
```

```
<paper>
  <authors>
    <author>HATTORI</author>
    <author>TANAKA</author>
  </author>
  <title>DATABASE ... </title>
</paper>
```

FIG.4

```
for $x in //paper
where contains($x, "XML")
return $x
```

FIG.5

```
declare function myfunc($a, $b) {
  if ($a = 0)
  then
    for $x in /book
    for $y in /author
    where $x//author=$y//name
    return
      <book>{$x/title}</book>
  else
    <book>{$b}</book>
}
myfunc(0, "test");
```

FIG.7

```
Module ::= MainModule
MainModule ::= QueryBody
QueryBody ::=Expr
Expr ::=ExprSingle
ExprSingle ::=FLWORExpr | OrExpr
FLWORExpr ::= (ForClause | LetClause)+ WhereClause?"return"ExprSingl
ForClause ::="for" "$" VarName TypeDeclaration? PositionalVar?"in"ExprSingle (","$"...

(OMITTED)

PathExpr ::= ("/" RelativePathExpr?) | ("//" RelativePathExpr) | RelativePathExpr
RelativePathExpr ::= StepExpr | (("/" | "//")StepExpr)*
StepExpr ::= FilterExpr | AxisStep (OMITTED)
```

FIG.10

KD1
```
(
  (
    ($x <book><author>TANAKA</author><title>XML</title><body>XML IS ···</body></book>)
  )
  (
    ($x <book><body>DATABASE</body><author>SATO</author><title>DBMS</title></book>)
  )
  ...
)
```

N1

KD2
```
(
  (
    ($x <book><author>TANAKA</author><title>XML</title><body>XML IS ···</body></book>)
    ($x0 <author>TANAKA</author>)
  )
  (
    ($x <book><body>DATABASE</body><author>SATO</author><title>DBMS</title></book>)
    ($x0 <author>SATO</author>)
  )
  ...
)
```

FIG.11

KD3
```
(
  (
    ($y <author><name>TANAKA</name></author>)
  )
  (
    ($y <author>SUZUKI</author>)
  )
  ...
)
```

N2

KD4
```
(
  (
    ($y <author><name>TANAKA</name></author>)
    ($y0 <name>TANAKA</name>)
  )
  (
    ($y <author>SUZUKI</author>)
    ($y0 )
  )
  ...
)
```

FIG.12

KD5
```
(
  (
    ($x <book><author>TANAKA</author><title>XML</title><body>XML IS ...</body></book>)
    ($x0 <author>TANAKA</author>)
    ($y <author><name>TANAKA</name></author>)
    ($y0 <name>TANAKA</name>)
  )
  ...
)
```

KD6
```
(
  (
    ($x <book><author>TANAKA</author><title>XML</title><body>XML IS ...</body></book>)
    ($x0 <author>TANAKA</author>)
    ($y <author><name>TANAKA</name></author>)
    ($y0 <name>TANAKA</name>)
    ($0 <title>XML</title>)
  )
  ...
)
```

N3

KD7
```
<title>XML</title>
```

KD8
```
<book>
  <title>XML</title>
</book>
```

FIG.15

```
Module ::= MainModule
MainModule ::= QueryBody
QueryBody ::=Expr
Expr ::=ExprSingle
ExprSingle ::=FLWORExpr | OrExpr
FLWORExpr ::= (ForClause | LetClause)+ WhereClause?"return"ExprSingl
ForClause ::="for" "$" VarName TypeDeclaration? PositionalVar?"in"ExprSingle (".""$" ⋯

(OMITTED)

PathExpr ::=("/" RelativePathExpr?) | RelativePathExpr
RelativePathExpr ::= StepExpr(("/")StepExpr)*
StepExpr ::= FilterExpr | AxisStep (OMITTED)
```

DEVICE, METHOD, AND COMPUTER-READABLE RECORDING MEDIUM FOR NOTIFYING CONTENT SCENE APPEARANCE

CROSS-REFERENCE TO RELATED APPLICATIONS

This application is based upon and claims the benefit of priority from the prior Japanese Patent Application No. 2007-278604, filed on Oct. 26, 2007; the entire contents of which are incorporated herein by reference.

BACKGROUND OF THE INVENTION

1. Field of the Invention

The present invention relates to a coordinator server configured to be connected to a plurality of database servers each having a database for storing extensible markup language (XML) data to constitute a distributed XML database server, and a distributed processing method.

2. Description of the Related Art

Conventionally, as a high speed technology of a processor that performs reading, interpretation, and execution of commands, and writing of results thereof, for example, there is a pipeline processing technology. Pipeline processing independently operates a process of each phase, in which before a processing cycle of a previous phase finishes, a process of the next phase is started, and this process is repeated. Accordingly, an assembly-line operation is realized and the performance of the entire processing is improved.

Meanwhile, there is a parallel database technology as a technique for managing a large amount of data. In the parallel database technology, a system including a plurality of servers is established to correspond to a large amount of data. A large amount of data set having a uniform data format is arranged in a plurality of databases. There is also a case that the data set is arranged not in a distributed manner, but in an overlapped manner on a plurality of databases. By arranging the data set in this manner, an improvement of throughput can be expected in a case that the number of simultaneous accesses to the same data is high.

A system of managing the data in such a parallel database is largely divided into three methods, that is, a system in which a plurality of servers do not share a disk (disk non-shared system), a system in which the servers share a disk (disk sharing system), and a system in which the servers share a disk and a memory (memory sharing system).

The disk nonshared system is mainly explained here. When the data set is divided into a plurality of databases and arranged, two methods of vertical division of data set and horizontal division of data set can be considered (fragmentation). The horizontal division of the data set is to create a subset of data set. A data partitioning technique described later becomes important. The vertical division of the data is to divide the data in a unit of attribute or column. Each division method includes a merit and demerit according to an individual access pattern. For example, in the vertical division of data, high speed can be acquired if data scanning of a size with few inquiries is good enough. However, if original data is required, data coupling is required between servers, and the performance is greatly deteriorated.

Each server used in the parallel database in the disk nonshared system can perform parallel access by individually accessing a plurality of databases in which the data set is arranged in the divided manner, and improvement of performance corresponding to the number of databases can be expected. Accordingly, processing efficiency and response time can be improved (partition parallelization).

As the data partitioning method, key range partitioning and hash partitioning are known. For example, it is assumed here that a large amount of data set is expressed with relation. In the key range partitioning and the hash partitioning, there are a case of using one column value of a table and a case of using a plurality of column values of the relation. When such data partitioning is performed, although loads are concentrated, in search with a range condition with respect to a target column, inefficiency caused by accessing an irrelevant database can be avoided. Further, in the search including natural coupling in the target column, coupling between different databases is not required, thereby enabling to considerably improve the performance.

In the parallel database, loads are concentrated on a specific database at the time of search, unless balanced data partitioning is performed, thereby making it difficult to exhibit a parallelization effect. However, respective data sizes may be unbalanced due to a change in the trend of input data, which cannot be avoided by using a predetermined data division rule. Therefore, improvement techniques such as dynamically changing the key range and changing the hash value have been proposed. With these techniques, however, the load due to data shift related to the change increases.

The parallel database often includes one coordinator server and a plurality of database (DB) servers. In such a configuration, following processing is performed in the parallel database. That is, the coordinator server having received a request from a client analyzes the request to generate a plan, and divides and distributes the plan to each of the DB servers. Each DB server executes the distributed plan and transmits data set of a processing result to the coordinator server. The coordinator server performs aggregation processing such as merge with respect to the transmitted data set, and transmits the aggregation result to the client. The data transferred between the servers is stream transmitted on a network such as a local area network (LAN). Therefore, in the parallel database, also the network is often realized on distributed parallel platforms such as interconnect between high-speed servers.

To realize high speed in the above processing, in the parallel database, a mechanism for performing phase processing such as scanning, sorting, and joining of internal processing of structured query language (SQL) in parallel by a plurality of processes and a plurality of servers is incorporated. In a part of database products, a pipeline system in which the process in each phase is operated independently, and before a previous phase process finishes, the next phase process is started has been adopted (pipeline parallelization).

Further, in an XML database that stores XML data, as a query requesting acquisition of the XML data, for example, a functional language referred to as XQuery having a static typing function is used, to acquire a data set of the processing result. Single XQuery processing performed by using the XQuery is largely divided into an approach for processing XML data as the functional language, and an approach for processing the XML data by a tuple operation. Recently, distributed XQuery processing technology for realizing such XQuery processing by a distributed system has been developed. However, an attempt of distributed XQuery processing has just been started, and articles describing the distributed XQuery processing are found only occasionally. For example, there are articles in 'Christopher Re, et. al., "Distributed XQuery", IIWeb 2004 Highly Distributed XQuery with DXQ' and 'Mary Fernandez, et. al., "Highly Distributed XQuery with DXQ", SIGMOD 2007'.

The distributed XML database that performs the distributed XQuery processing has, for example, a master-slave distributed architecture in which a plurality of database servers are designated as slaves and a coordinator server that coordinates the database servers is designated as a master. In such a distributed XML database, for example, it is assumed that, in an XQuery specification for performing the conventional single XQuery processing, an XQuery specification partially extended so that query shipping can be executed is used.

However, when the specification in which the XQuery specification for performing the conventional single XQuery processing is partially extended is used, a user who generates XQuery needs to describe a distributed processing procedure, and therefore it is not always true that the distribution transparency is high (XQueryD). The distribution transparency realizes a distributed system by causing the distributed configuration to appear as if it is a centralized system, without making a user conscious of the distributed configuration.

SUMMARY OF THE INVENTION

According to one aspect of the present invention, there is provided a coordinator server that is configured to be connected to a plurality of distributed database servers each having a database for storing extensible markup language data. The coordinator server includes a first receiving unit that receives a query requesting to acquire extensible markup language data satisfying a predetermined condition from a client; an acquiring unit that acquires processing capacity information indicating a processing capacity of a database server for the query from each of the database servers; a generating unit that generates a first code indicating a first processing to be performed by each of the database servers, and a second code indicating a second processing to be performed by using an execution result of the first code by referring to the processing capacity information for the query; a first transmitting unit that transmits the first code to each of the database servers; a second receiving unit that receives first result data including a part of or all extensible markup language data acquired as a result of executing the first processing from each of the database servers; an executing unit that executes the second processing indicated by the second code using the first result data; and a second transmitting unit that transmits second result data including a part of or all extensible markup language data acquired as a result of executing the second processing to the client.

Furthermore, according to another aspect of the present invention, there is provided a coordinator server that is configured to be connected to a plurality of distributed database servers each having a database for storing extensible markup language data. The coordinator server includes a first receiving unit that receives a query requesting to acquire extensible markup language data satisfying a predetermined condition from a client; a generating unit that generates a first code indicating a first processing to be performed by each of the database servers, using an execution result of the first code, a tuple code indicating a second processing by a tuple operation and a procedure code indicating a third processing by a procedure operation; a first transmitting unit that transmits the first code to each of the database servers; a second receiving unit that receives first result data including a part of or all extensible markup language data acquired as a result of executing the first processing from each of the database servers; an executing unit that executes the second processing and the third processing by using the first result data; and a second transmitting unit that transmits second result data including a part of or all extensible markup language data acquired as a result of executing the second processing and the third processing to the client.

Moreover, according to still another aspect of the present invention, there is provided a distributed processing method to be executed in a coordinator server connected to a plurality of distributed database servers each having a database for storing extensible markup language data. The distributed processing method includes receiving a query requesting to acquire extensible markup language data satisfying a predetermined condition from a client; acquiring processing capacity information indicating a processing capacity of a database server for the query from each of the database servers; generating a first code indicating a first processing to be performed by each of the database servers, and a second code indicating a second processing to be performed by using an execution result of the first code by referring to the processing capacity information for the query; transmitting the first code to each of the database servers; receiving first result data including a part of or all extensible markup language data acquired as a result of executing the first processing from each of the database servers; executing the second processing indicated by the second code by using the first result data; and transmitting second result data including a part of or all extensible markup language data acquired as a result of executing the second processing to the client.

Furthermore, according to still another aspect of the present invention, there is provided a distributed processing method to be executed in a coordinator server connected to a plurality of distributed database servers each having a database for storing extensible markup language data. The distributed processing method includes receiving a query requesting to acquire extensible markup language data satisfying a predetermined condition from a client; generating a first code indicating a first processing to be performed by each of the database servers, and as a second code indicating a processing to be performed by using an execution result of the first code, a tuple code indicating a second processing by a tuple operation and a procedure code indicating a third processing by a procedure operation; transmitting the first code to each of the database servers; receiving first result data including a part of or all extensible markup language data acquired as a result of executing the first processing from each of the database servers; executing the second processing and the third processing by using the first result data; and transmitting second result data including a part of or all extensible markup language data acquired as a result of executing the second processing and the third processing to the client.

BRIEF DESCRIPTION OF THE DRAWINGS

FIG. 3 is an example of data structures of three XML data;

FIG. 4 depicts an XQuery data structure as an example of a query requesting acquisition of XML data that fulfils conditions;

FIG. 5 is an example in which the XQuery data structure is complicated;

FIG. 7 is an example of processing capacity information transmitted from a DB server;

FIG. 10 is an example of data of a result of execution of a query code by a DB server;

FIG. 11 is another example of data of a result of execution of a query code by a DB server;

FIG. 12 is an example of data of a result of execution of the tuple code by a coordinator server;

FIG. 15 is another example of processing capacity information;

DETAILED DESCRIPTION OF THE INVENTION

Exemplary embodiments of the present invention will be explained below in detail with reference to the accompanying drawings.

Figure 1:
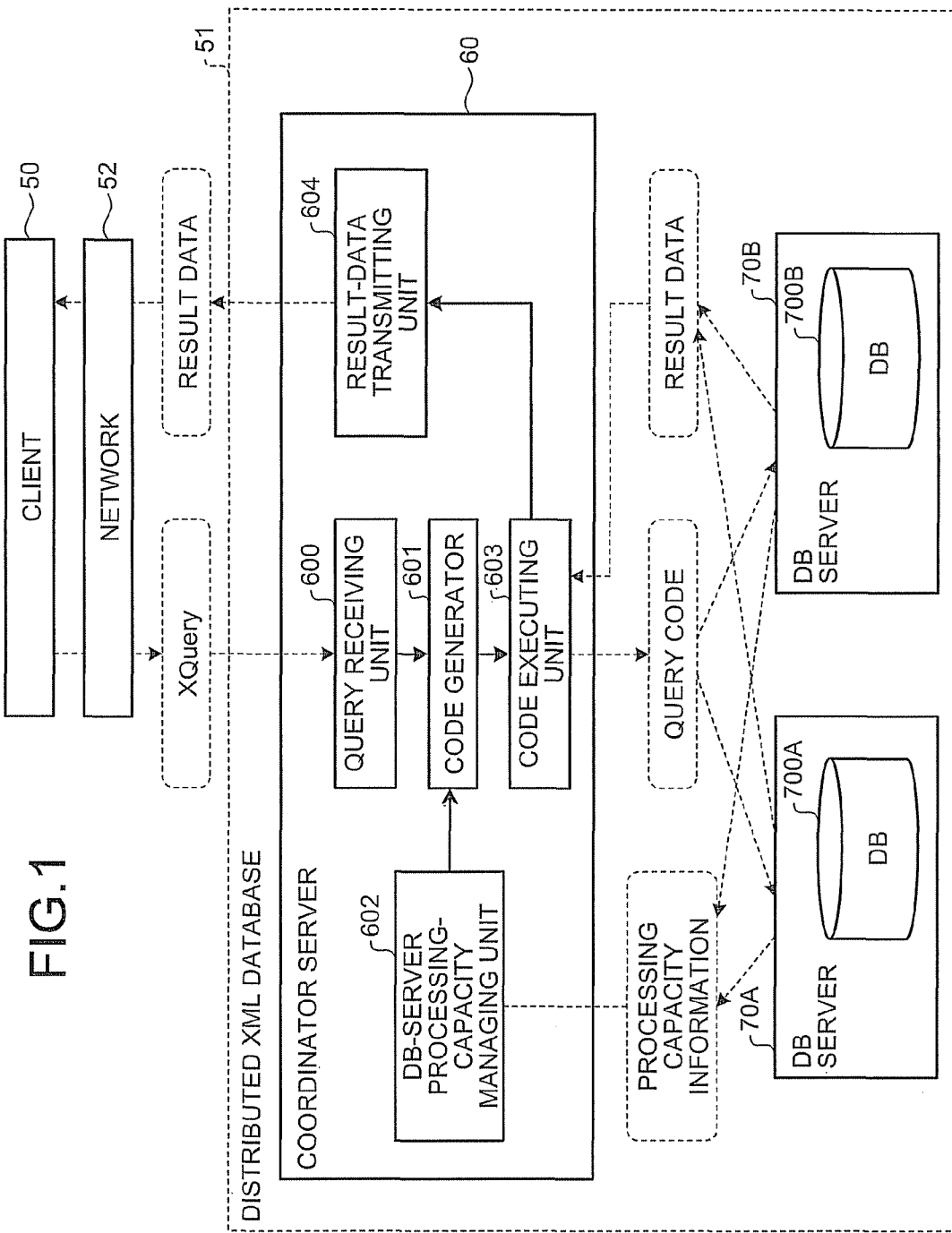
FIG. 1 is an example of a configuration of a distributed XML database system according to an embodiment of the present invention.

FIG. 1 is an example of a configuration of a distributed XML database system according to an embodiment of the present invention. The distributed XML database system includes a client computer (hereinafter, "client") 50 that executes an application program, and a distributed XML database 51, where the client 50 and the distributed XML database 51 are connected via a network 52. The distributed XML database 51 has a coordinator server 60 and a plurality of DB servers 70A to 70B. The network 52 is, for example, a LAN, the Intranet, the Ethernet (registered trademark), or the Internet.

The coordinator server 60 is connected to the client 50 and the DB servers 70A to 70B. The coordinator server 60 receives a query (XQuery) for requesting acquisition of XML data that fulfils the conditions from the client 50, performs processing corresponding to the query, and transmits result data of a processing result to the client 50. Further, the coordinator server 60 receives processing capacity information (extension Backus-Naur Form (BNF)) indicating the processing capacity (XQuery solving capacity) of the DB servers 70A to 70B with respect to the query from the DB servers 70A to 70B. When performing the processing corresponding to the query received from the client 50, the coordinator server 60 refers to the processing capacity information, to make a processing request to the DB servers 70A to 70B, receives the processing result from the DB servers 70A to 70B, executes processing by using the processing result to generate result data, and transmits the result data to the client 50.

The DB server 70A has a database 700A for storing XML data, acquires the XML data corresponding to the processing request from the coordinator server 60 from the database 700A, and transmits result data including the XML data to the coordinator server 60 as the processing result. The DB server 70B has a database 700B for storing XML data, acquires the XML data corresponding to the processing request from the coordinator server 60 from the database 700B, and transmits result data including the XML data to the coordinator server 60 as the processing result. The DB servers 70A to 70B respectively transmit the processing capacity information to the coordinator server 60, at the time of connection to the distributed XML database system.

The client 50, the coordinator server 60, and the DB servers 70A to 70B respectively includes a controller such as a central processing unit (CPU) that controls the entire apparatus, memories such as a read only memory (ROM) for storing various data and various programs and a random access memory (RAM), an external memory such as a hard disk drive (HDD) or a compact disk (CD) drive for storing various data and various programs, a display device such as a display that displays information, an input unit such as a keyboard and a mouse for a user to input various processing requests, a communication controller that communicates with an external computer via the network 52, and a bus for connecting these, and have a hardware configuration using a normal computer.

In such a hardware configuration, various functions to be realized by the coordinator server 60 by executing various programs stored in the memory and the external memory are explained. Each unit, which is an entity of various functions realized by the coordinator server 60, is explained. The coordinator server 60 includes a query receiving unit 600, a code generator 601, a DB-server processing-capacity managing unit 602, a code executing unit 603, and a result-data transmitting unit 604. The query receiving unit 600 receives a query transmitted from the client 50.

The code generator 601 analyzes the query received by the query receiving unit 600, and refers to the respective pieces of processing capacity information of the DB servers 70A to 70B to generate various codes. The codes generated by the code generator 601 include a code (query code) indicating processing to be performed by the DB servers 70A to 70B, a code (tuple code) indicating processing to be performed by the tuple operation, and a code (procedure code) indicating processing to be performed by a procedure operation. The tuple code and the procedure code are for the coordinator server 60 to process the result data acquired by the DB servers 70A to 70B by executing the processing indicated by the query code. It is assumed here that calculation speed is faster in the tuple operation than in the procedure operation. These specific examples will be described later.

The DB-server processing-capacity managing unit 602 receives the processing capacity information, respectively, from the DB servers 70A to 70B and manages these pieces of information. Specifically, the DB-server processing-capacity managing unit 602 stores the processing capacity information in the RAM or the like, to control an access to the processing capacity information. The code executing unit 603 transmits the query code generated by the code generator 601 to the DB servers 70A to 70B, and receives result data including a part or all of the XML data from the DB servers 70A to 70B as an execution result of the processing indicated by the query code. The code executing unit 603 further executes processing indicated by the tuple code and the processing indicated by the procedure code generated by the code generator 601, to generate result data including a part or all of the XML data as the execution result thereof. The result-data transmitting unit 604 transmits the result data generated by the code executing unit 603 to the client 50.

Figure 2:
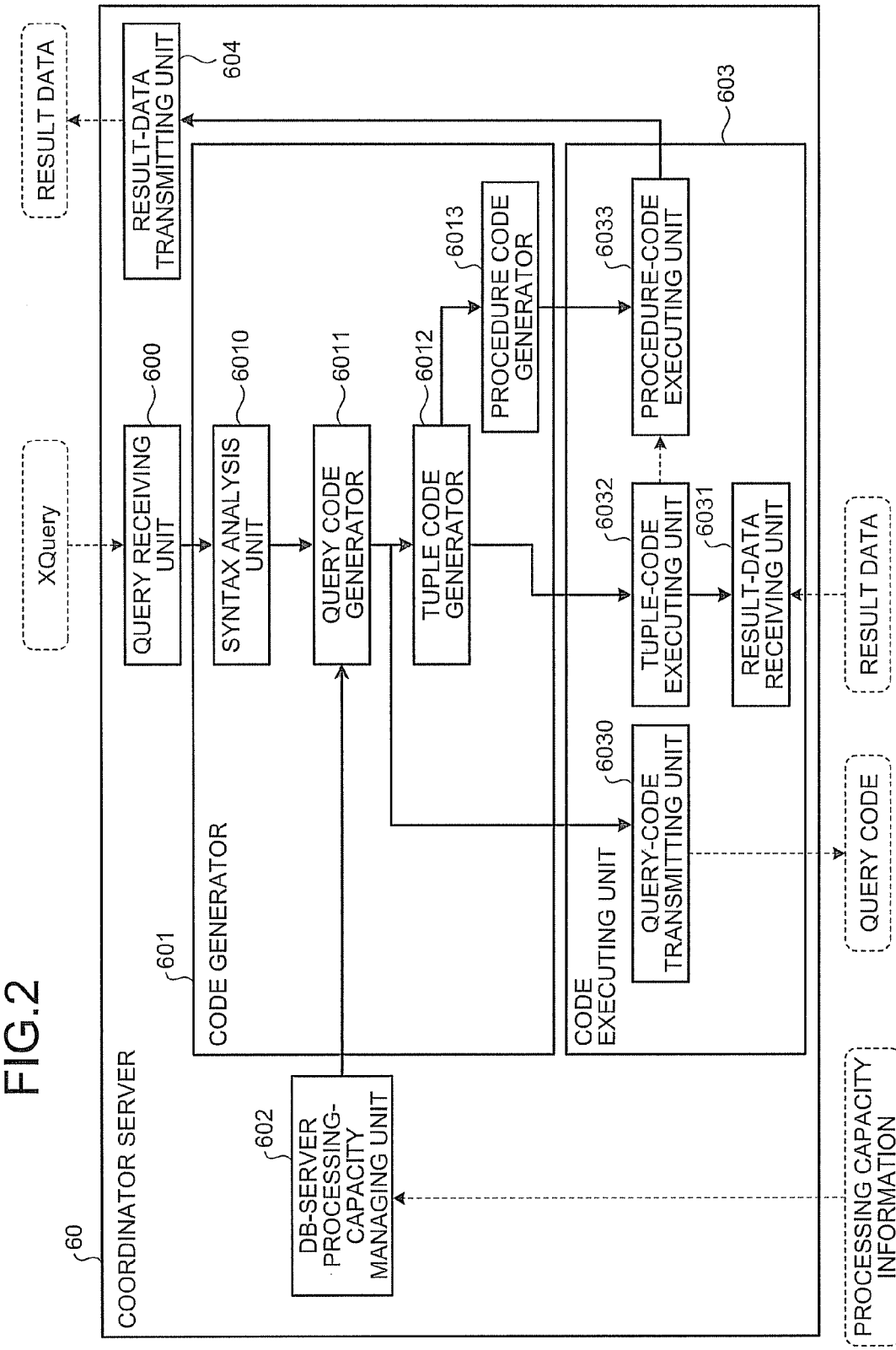
FIG. 2 is an example of a functional configuration of a code generator and a code executing unit.

A functional configuration of the code generator 601 and the code executing unit 603 included in the coordinator server 60 shown in FIG. 1 is explained in detail. FIG. 2 is an example of the functional configuration of the code generator 601 and the code executing unit 603. The code generator 601 includes a syntax analysis unit 6010, a query code generator 6011, a tuple code generator 6012, and a procedure code generator 6013. The code executing unit 603 includes a query-code transmitting unit 6030, a result-data receiving unit 6031, a tuple-code executing unit 6032, and a procedure-code executing unit 6033.

The syntax analysis unit 6010 performs syntax analysis with respect to the query (XQuery) received by the query receiving unit 600 from the client 50. The query code generator 6011 scans a syntax acquired by the syntax analysis performed by the syntax analysis unit 6010, to generate a query code with respect to the DB servers 70A to 70B, respectively, based on a first syntax portion corresponding to a part of the syntax and in a range of the processing capacity indicated by the processing capacity information. The tuple code generator 6012 generates the tuple code based on a second syntax portion corresponding to a portion other than the first syntax portion and in a range that the tuple operation is possible, of the syntax acquired by the syntax analysis performed by the syntax analysis unit 6010. The procedure code generator 6013 generates the procedure code based on a third syntax portion corresponding to a portion other than the first and second syntax portions, of the syntax acquired by the syntax analysis performed by the syntax analysis unit 6010.

The tuple code is a program for performing processing by regarding data to be handled as a tuple. The tuple is an element column, and a tuple in a relational database means a row. To process the tuple, the tuple code includes a combination of operators such as union (UNION), difference (DIFF), Cartesian product (CARTESIAN PRODUCT), projection (PROJECT), and selection (SELECT).

The procedure code is a program indicating a series of operation procedure for processing the data to be handled. To express the procedure, the procedure code uses a control structure such as conditional branching (COND), function call (FUNCCALL), and repeat (WHILE, LOOP). When function call is performed, an argument is provided as an input, and a return value is returned as an output.

In the present embodiment, the processing to be performed according to a query (XQuery) is divided into processing performed by the DB servers 70A to 70B, a range in which the tuple operation is possible by using result data acquired as a result of execution of the processing indicated by the query code performed by the DB servers 70A to 70B, and a range in which the tuple operation is not possible, which are then processed by the query code, the tuple code, and the procedure code, respectively. By performing the processing by the combination of the three codes, the XQuery can be processed transparently, using the distributed servers.

The query-code transmitting unit 6030 transmits the query code generated by the query code generator 6011 to the DB servers 70A to 70B. The result-data receiving unit 6031 receives the result data transmitted from the DB servers 70A to 70B. The tuple-code executing unit 6032 executes the processing indicated by the tuple code generated by the tuple code generator 6012 by using the result data received by the result-data receiving unit 6031. The procedure-code executing unit 6033 executes processing indicated by the procedure code generated by the procedure code generator 6013 by using the data of the result of executing the processing indicated by the tuple code by the tuple-code executing unit 6032, and generates result data including a part or all of the XML data as the execution result. The result data is transmitted to the client 50 by the result-data transmitting unit 604.

The XML data is explained. In the XML, an individual part forming a document structure is referred to as an "element". Each element is described by using a tag. Specifically, one element is expressed by putting text data between two tags, that is, a tag indicating beginning of the element (start tag) and a tag indicating the end of the element (end tag). The text data put between the start tag and the end tag is a text element (text node) included in one element expressed by the start tag and the end tag.

FIG. 3 is an example of data structures of three XML data. In the example shown in FIG. 3, each XML data includes a plurality of partial XML data put between <paper> elements. Specifically, the partial XML data here are XML data related to a title of a document put between <title> elements, XML data related to a text of the document put between <body> elements, and XML data for each row put between <P> elements. Thus, data having a plurality of hierarchical structures and meanings is present in one XML data.

XQuery is explained next. XQuery is a functional language for query to the XML database, and the feature thereof is for-let-where-order by-return (FLWOR) syntax. Query language in a relational database (RDB) is SQL. While SQL is declaratory language, XQuery has many features as the functional language. The language specification of XQuery is explained from a standpoint of procedure.

Syntax of for-clause is "for variable in expression". The syntax of for-clause has a meaning of substituting one satisfying the expression in the variable to loop. Syntax of let-clause is "let variable:=expression". The syntax of let-clause has a meaning of putting ones satisfying the expression together and substituting it in the variable as a sequence. The sequence is a flat list. A where-clause is for limiting the loop repeated by F. The syntax of where-clause is "where expression". The syntax of where-clause has a meaning that only one satisfying the expression is looped and others skip the loop. A return-clause is for formatting a result of processing of the XQuery. The syntax of return-clause is "return expression". The syntax of return-clause can describe arbitrary XML data including a variable. The syntax of the variable is "$ character string". The variables having the same character string are regarded as the same, except for a case that double declarations are made by nested query or the like. As a path operator for specifying a hierarchy condition between elements in the XML data, the XQuery includes the following elements.

"/": Operator indicating that elements have parent-child relationship.

"//": Operator indicating that elements have ancestor-descendant relationship.

".": Arbitrary element.

FIG. 4 depicts an XQuery data structure as an example of a query requesting acquisition of XML data that fulfils conditions. The XQuery shown in FIG. 4 requests that "a text having a descendant returns data referred to as paper in the database including "XML".

FIG. 5 is an example in which the XQuery data structure is complicated. In FIG. 5, "declare function . . . " defines a user-defined function "myfunc", and uses two variables of "$a" and "$b" as the argument. In myfunc, there is conditional branching, where if the value of "$a" is "0", the FLWOR expression is processed. Otherwise, a value of "<book>{$b}</book>" including the variable "$b" is returned. Outside the user-defined function, there is a function call of "myfunc(0, "test")".

Figure 6:
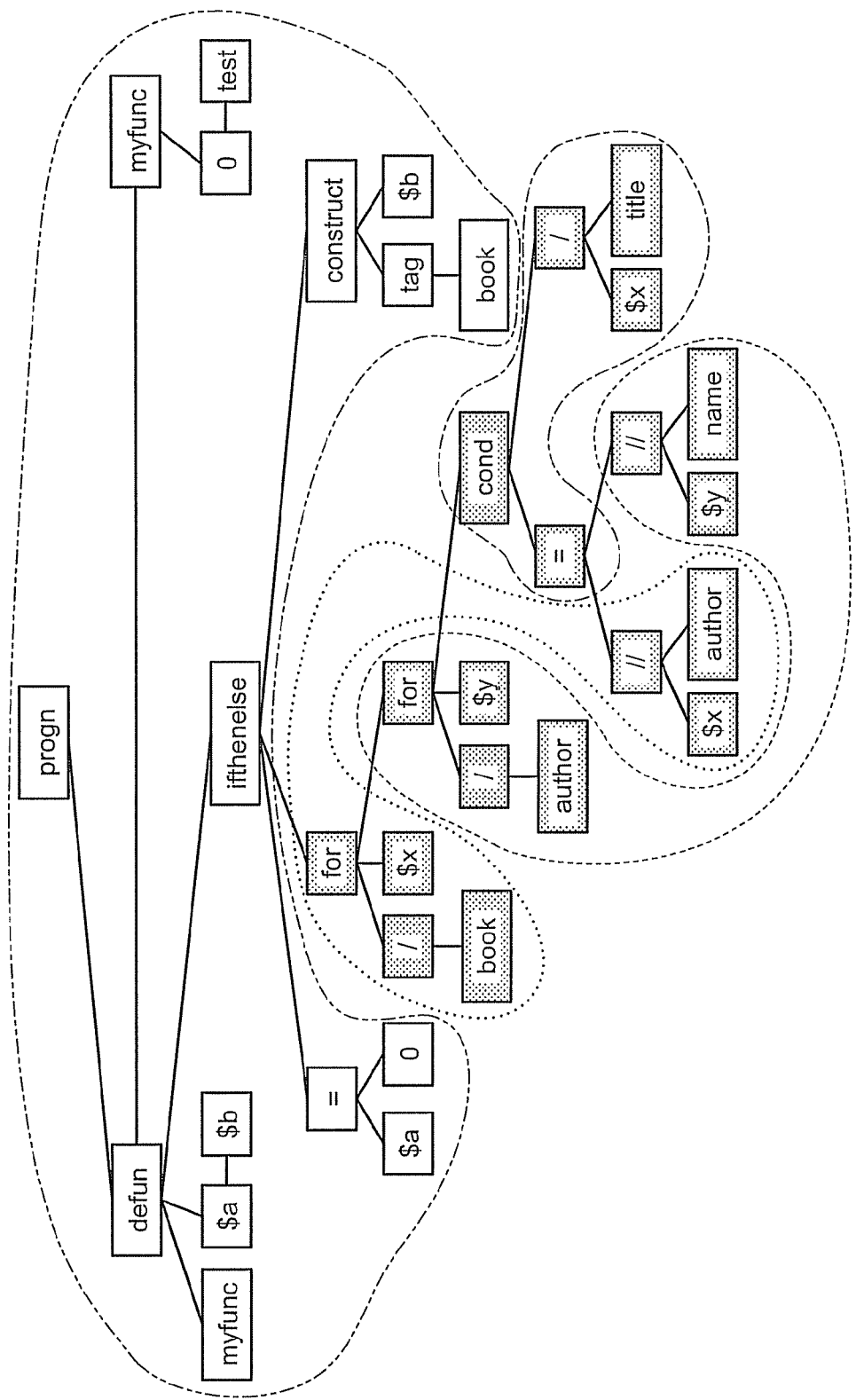
FIG. 6 is an example of a result of syntax analysis of XQuery shown in FIG. 5, acquired by a syntax analysis unit shown in FIG. 4.

FIG. 6 is an example of a result of the syntax analysis of the XQuery shown in FIG. 5, acquired by the syntax analysis unit 6010 shown in FIG. 4. The syntax analysis is realized by combining a compiler parser generator (compiler-compiler) such as Yacc and a lexical analyzer generator, which is a lexical analysis program, such as Lex. A result of syntax analysis has a tree structure, designating "prong" as a root. "defun" expresses an intrinsic function defining a user function.

FIG. 7 is an example of the processing capacity information transmitted from the DB server 70A. This is acquired by defining the XQuery syntax by BNF, and Module expresses a root of definition. A BNF-defined part corresponding to FLWOR is "FLWORExpr". "PathExpr" defines a path, and there is "RelativePathExpr" as a BNF-defined part constituting the PathExpr, which indicates that a syntax such as "/" or "//" can be handled. Thus, the processing capacity information expresses a query syntactic form that can be processed by the DB server 70A.

Figure 8:
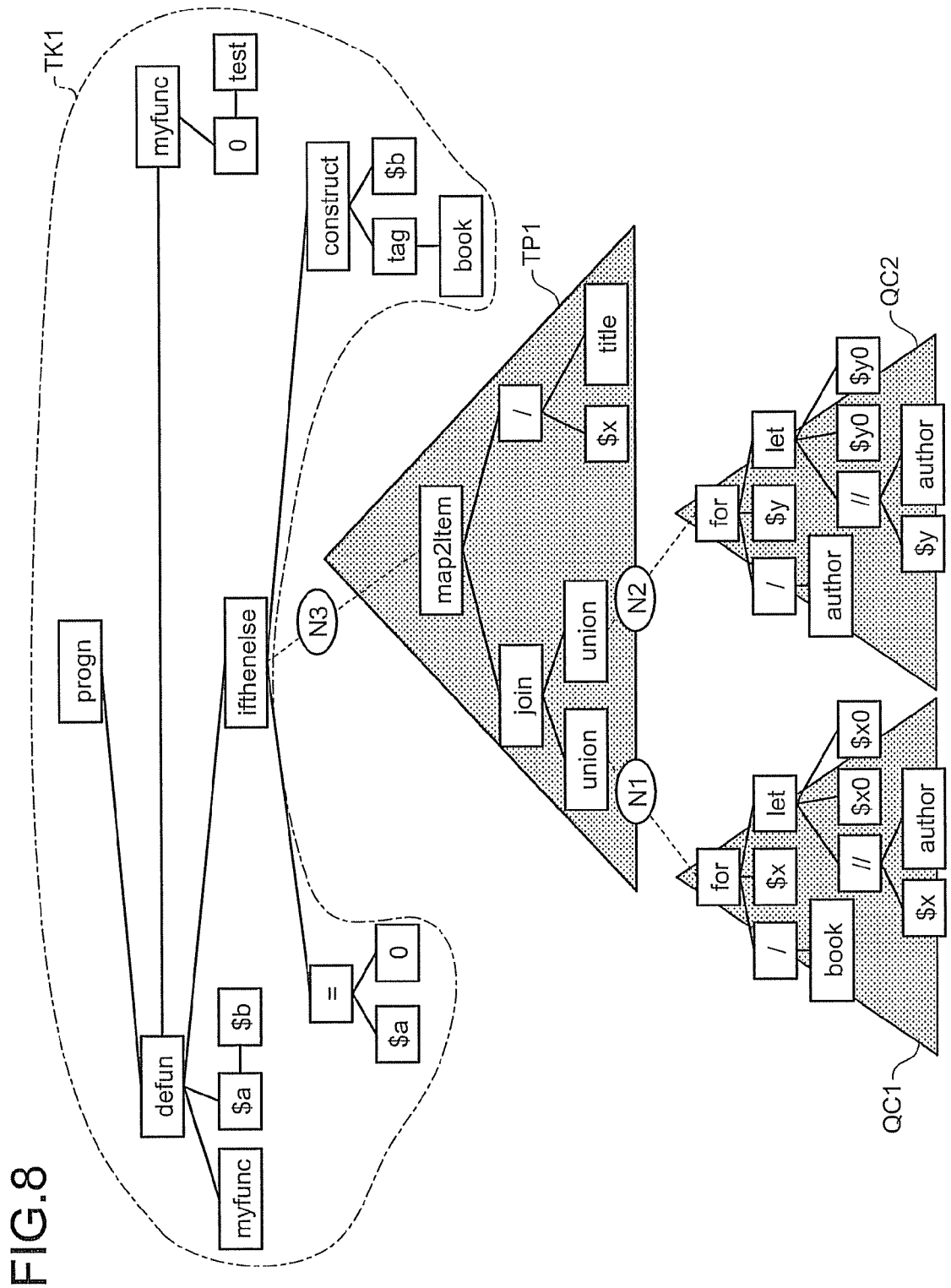
FIG. 8 is an example of a query code generated by a query code generator by referring to the processing capacity information shown in FIG. 7, a tuple code generated by a tuple code generator, and a procedure code generated by a procedure code generator, with respect to a result of syntax analysis shown in FIG. 6.
Figure 9:
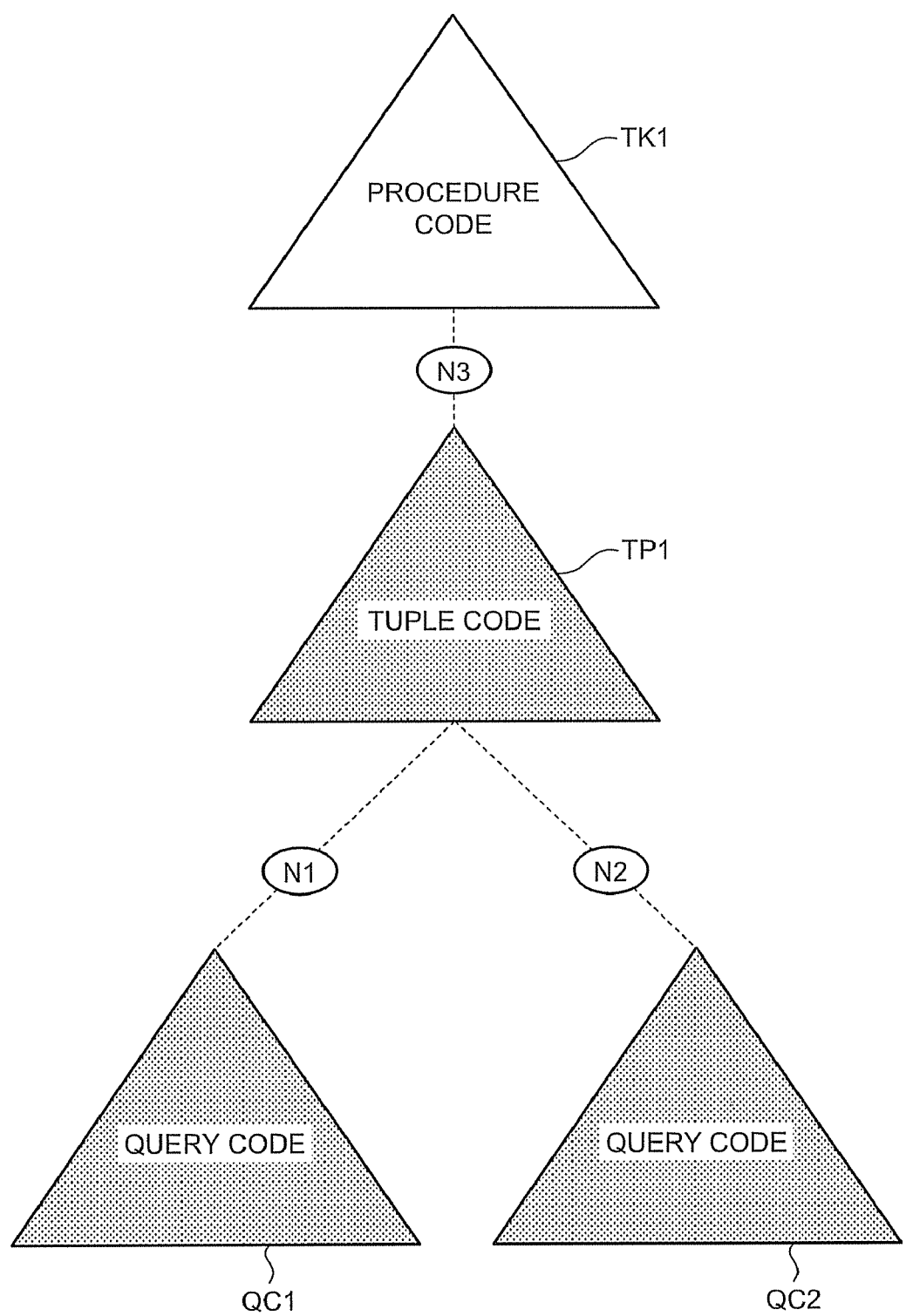
FIG. 9 depicts a relation between respective codes shown in FIG. 8 in a simplified manner.

FIG. 8 is an example of the query code generated by the query code generator 6011 by referring to the processing capacity information shown in FIG. 7, the tuple code generated by the tuple code generator 6012, and the procedure code generated by the procedure code generator 6013, with respect to a result of syntax analysis shown in FIG. 6. FIG. 9 depicts a relation between respective codes shown in FIG. 8 in a simplified manner. A portion enclosed by dotted line in FIG. 6 corresponds to a query code QC1 in FIG. 8. A portion enclosed by broken line in FIG. 6 corresponds to a query code QC2 in FIG. 8. A portion enclosed by one-dot-chain line in FIG. 6 corresponds to a tuple code TP1 in FIG. 8. A portion enclosed by two-dot-chain line in FIG. 6 corresponds to a procedure code TK1 in FIG. 8. Further, as shown in FIGS. 8 and 9, the query codes QC1 to QC2 and the tuple code TP1 are respectively connected to each other by connections N1 to N2. The tuple code YP1 and the procedure code TK1 are connected to each other by connection N3. Respective codes are expressed by a hierarchical structure. The lowermost code is query codes QC1 and QC2, and the tuple code TP1 is in the upper stage thereof, and the procedure code TK1 is at the uppermost stage.

The connections N1 to N3 function as a buffer for buffering data, and also function as an event that generates synchronous wait for performing data transfer. The coordinator server 60 receives the result data, which is the execution result of the processing respectively expressed by the query codes QC1 and QC2, and buffers the result data in the connections N1 and N2. Further, the coordinator server 60 buffers the result data, which is the execution result acquired by executing the processing expressed by the tuple code TP1 with respect to the result data buffered in the connections N1 and N2, in the connection N3. The coordinator server 60 then executes the processing expressed by the procedure code TK1 with respect to the result data buffered in the connection N3. That is, when the query codes QC1 and QC2 and the tuple code TP1 are allocated to separate processes and executed in parallel, the upper level code receives the execution result of the lower level code. However, in the connections N1, N2, and N3, synchronous wait occurs for performing data transfer. Further, because the tuple code and the procedure code TK1 are executed by separate threads, synchronous wait of the procedure code TK1 occurs until the processing expressed by the tuple code TP1 finishes. Thus, the connections N1 to N3 buffer the result data and has a data structure added with a thread synchronization mechanism such as Mutex, and for example, are formed in a memory such as the RAM.

The query code QC1 is assumed to be transmitted to the DB server 70A and executed. The query code QC1 is for executing processing in which "/book" is taken out and set in variable "$x", and "$x/author" is taken out and set in variable "$x0". The query code QC2 is assumed to be transmitted to the DB server 70B and executed. The query code QC2 is for executing processing in which "/author" is taken out and set in variable "$y", and "$y/name" is taken out and set in variable "$y0".

The tuple code TP1 indicates processing for combining result data acquired as execution results of two query codes QC1 and QC2. For example, the tuple code TP1 is expressed by a combination of processes such as union (UNION), difference (DIFF), Cartesian product (CARTESIAN PRODUCT), projection (PROJECT), and selection (SELECT). The coordinator server 60 receives the result data as the execution results of the query codes QC1 and QC2 by the tuple code TP1 through the connections N1 and N2, respectively, and then executes following processing. That is, the UNION is calculated from the received result data for the number of DB servers 70A to 70B. Join (JOIN) is performed with respect to the UNION to generate result (MAP2ITEM), and finally "$x/title" is returned.

The procedure code TK1 is for performing definition of the user-defined function (DEFUN). Specifically, after the result of result generation (MAP2ITEM) is received through the connection N3, processing for calling the user-defined function is executed.

FIG. 10 is an example of data of the result of execution of the query code QC1 by the DB server 70A. Result data KD1 is an execution result of "for $x in /book", which is a part of the query code QC1. Candidates of a value with respect to "$x" are expressed by tuple. Result data KD2 is an execution result of the query code QC1. Candidates of values with respect to "$x" and "$x0" are expressed by tuple.

FIG. 11 is an example of data of the result of execution of the query code QC2 by the DB server 70B. Result data KD3 is an execution result of "for $y in /author", which is a part of the query code QC2. Candidates of a value with respect to "$y" are expressed by tuple. Result data KD4 is an execution result of the query code QC2. Candidates of values with respect to "$y" and "$y0" are expressed by tuple.

FIG. 12 is an example of data of the result of execution of the tuple code by the coordinator server 60. Result data KD5 is a result of adding the result data KD2 and KD3 (UNION), respectively, for the number of DB servers 70A to 70B, and performing JOIN with respect to the result of UNION. Result data KD6 is a result of performing result generation (MAP2ITEM) and finally returning "$x/title". As a result, result data KD7 is used for executing the processing indicated by the procedure code via the connection N3. Result data KD8 is a result of executing the procedure code by using the result data KD7, that is, a result of defining the user-defined function (DEFUN), and finally calling the user-defined function. Because the user-defined function is "myfunc(0, "test")", conditional branching is established, thereby enabling to obtain the result of the FLWOR expression above.

Figure 13:
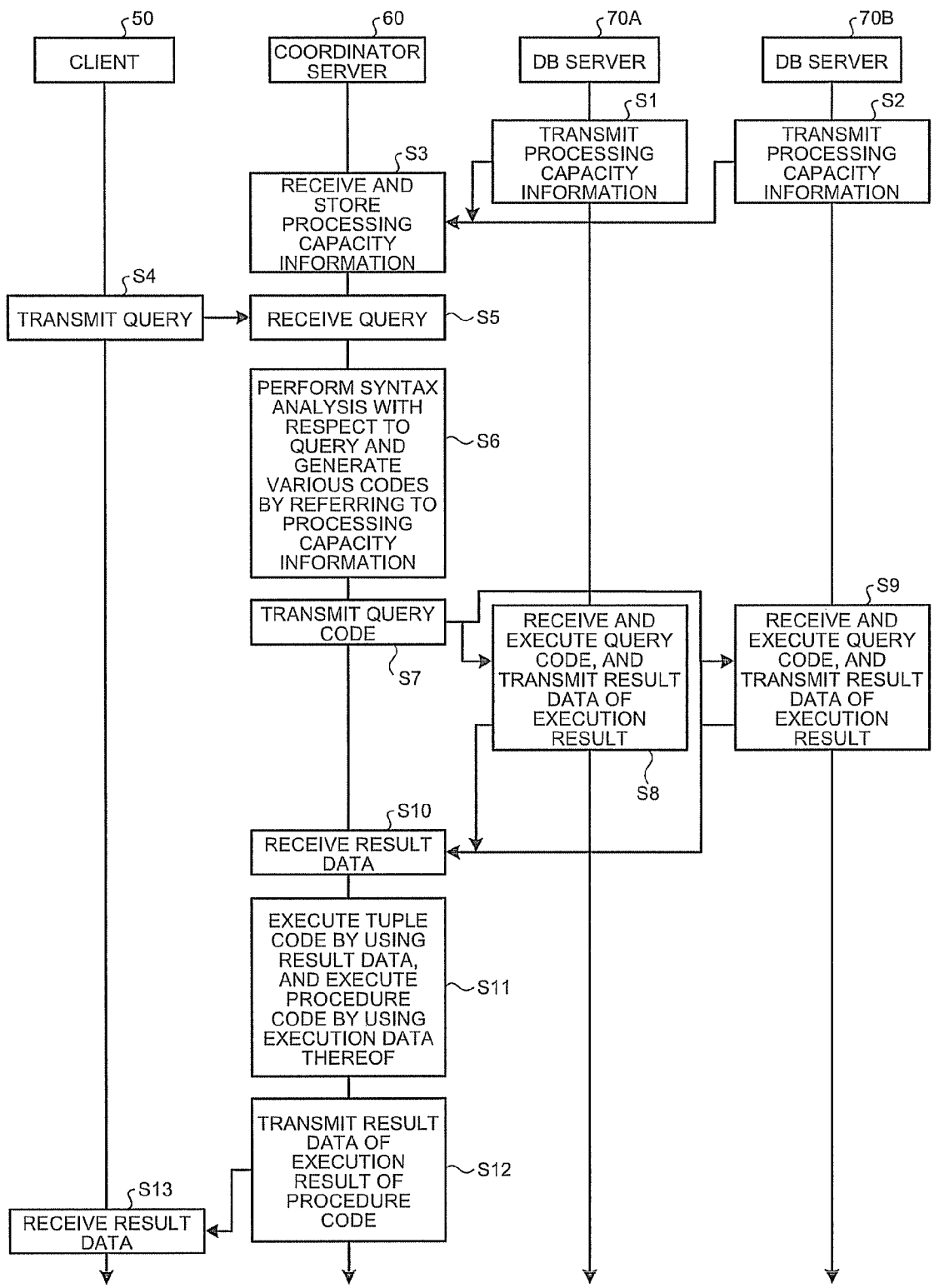
FIG. 13 is a sequence chart of a search process procedure performed by the distributed XML database system.

The operation of the distributed XML database system according to the present embodiment is explained next. FIG. 13 is a sequence chart indicating a search process procedure performed by the distributed XML database system. The DB servers 70A to 70B respectively transmit the processing capacity information of the own server to the coordinator server 60 at the time of connection to the distributed XML database system (Step S1 to S2). Upon reception of these pieces of information, the coordinator server 60 stores these pieces of information in a memory (Step S3). The client 50 then transmits a query requesting search of data corresponding to the condition to the coordinator server 60 (Step S4). Upon reception of the query (Step S5), the coordinator server 60 performs syntax analysis with respect to the query, and generate a query code, a tuple code, and a procedure code by referring to the processing capacity information transmitted from the DB servers 70A to 70B (Step S6). The coordinator server 60 then transmits the query code to the DB servers 70A to 70B, respectively (Step S7). Upon reception of the query code, the respective DB servers 70A to 70B execute the processing indicated by the query code, and as the execution result thereof, transmits result data including a part or all of the XML data to the coordinator server 60 (Steps S8 to S9). Upon reception of respective result data from the DB servers 70A to 70B (Step S10), the coordinator server 60 uses the result data to execute the processing indicated by the tuple code. The coordinator server 60 then uses the result data acquired as a result of execution of the processing indicated by the tuple code, to execute the processing indicated by the procedure code (Step S11). At this time, when the coordinator server 60 respectively executes the processing indicated by the tuple code and the processing indicated by the procedure code in parallel, the coordinator server 60 performs the processing, while achieving partial synchronization of data transfer. The coordinator server 60 then transmits result data including a part or all of the XML data as the execution result of the processing indicated by the procedure code to the client 50 (Step S12). The client 50 receives the result data as a result of query transmitted at Step S1 (Step S13).

A code generation process procedure in which the coordinator server 60 generates various codes at Step S6 is explained next with reference to FIG. 14. After having performed syntax analysis with respect to the query received from the client 50, the code generator 601 in the coordinator server 60 scans a node in a syntax tree ("DB ROOT") (that is, a portion of "/") in the analysis result, to select a node corresponding to the for-clause, and puts it in a scanning queue (Step S30). When scanning has not finished yet for all the nodes in the scanning queue (NO at Step S31), the code generator 601 calculates an evaluable partial tree (syntax portion) with respect to the nodes in the scanning queue. The code generator 601 here determines whether a first node starts with ("/") in the for-clause node (Step S32). When the determination result is positive (YES at Step S33), the code generator 601 refers to the processing capacity information stored in the memory to determine whether the partial tree at a first child node and below exceeds the processing capacity of the DB servers 70A to 70B, that is, whether the partial tree can be processed by the DB servers 70A to 70B (Step S34).

For example, with respect to the partial tree of ("/"-"book") shown in FIG. 6, "//" can be processed by referring to the processing capacity information shown in FIG. 7, and therefore it can be determined that the partial tree of "/" and below can be processed by the DB servers 70A to 70B. In this case (YES at Step S35), the code generator 601 selects the largest partial tree, which refers to a variable that does not exceed the processing capacity of the DB servers 70A to 70B, with respect to the partial tree of a third child node and below of the for-clause, because a second child node of the for-clause is a variable by all means (Step S36). For example, because at the third child node and below of the for-clause, "//" can be processed with respect to the variable "$x" by referring to the processing capacity information shown in FIG. 7, the partial tree of ($x//author) can be processed. Thus, the code generator 601 evaluates the partial tree from bottom up. The code generator 601 then generates the query code according to a configuration rule from the acquired-set of partial trees (Step S37). The configuration rule is a simple rule for generating a code from the set of partial trees. For example, there is such a rule that if a syntax is connected by "for" and "cond", it is transformed to a syntax of "for let". In this manner, the code generator 601 generates the query code. As a result, the query code QC1 shown in FIG. 8 is produced with respect to the DB server 70A, and the query code QC2 shown in FIG. 8 is produced with respect to the DB server 70B.

After scanning has finished for all the syntax trees (YES at Step S31), the code generator 601 determines whether the query code has been acquired (Step S38). If it is assumed here that the query code can be acquired, the code generator 601 checks the node of the syntax tree corresponding to the already acquired query code, to generate the tuple code, which joins the query codes, according to the configuration rule (Step S39). In FIG. 6, for example, because ($x//author) and ($x//name) are produced from the query code QC2, (cond) can be evaluated. Therefore, the code generator 601 inserts UNION with respect to the respective query codes, and performs JOIN, and transforms the result of (cond) to the result generation (MAP2ITEM). Thus, the code generator 601 calculates the evaluable portion from bottom up. Because conditional branching (IFTHENELSE) cannot be subjected to the tuple processing, conditional branching stops here. The code generator 601 then checks the nodes on the syntax tree, which are not formed as the query code or the tuple code, to form all these nodes as the procedure code (Step S40). The syntax analysis result can be executed directly as the procedure code, and therefore various codes as shown in FIG. 8 are finally generated.

In the above explanations, a case that the processing capacity information shown in FIG. 7 is referred to at the time of generating various codes has been explained. Various codes generated by referring to the processing capacity information shown in FIG. 15 are explained here, as another example of the processing capacity information. In FIG. 15, it is expressed that the syntax of "//" cannot be handled in (RelativePathExpr), which is the BNF-defined part constituting PathExpr.

Figure 14:
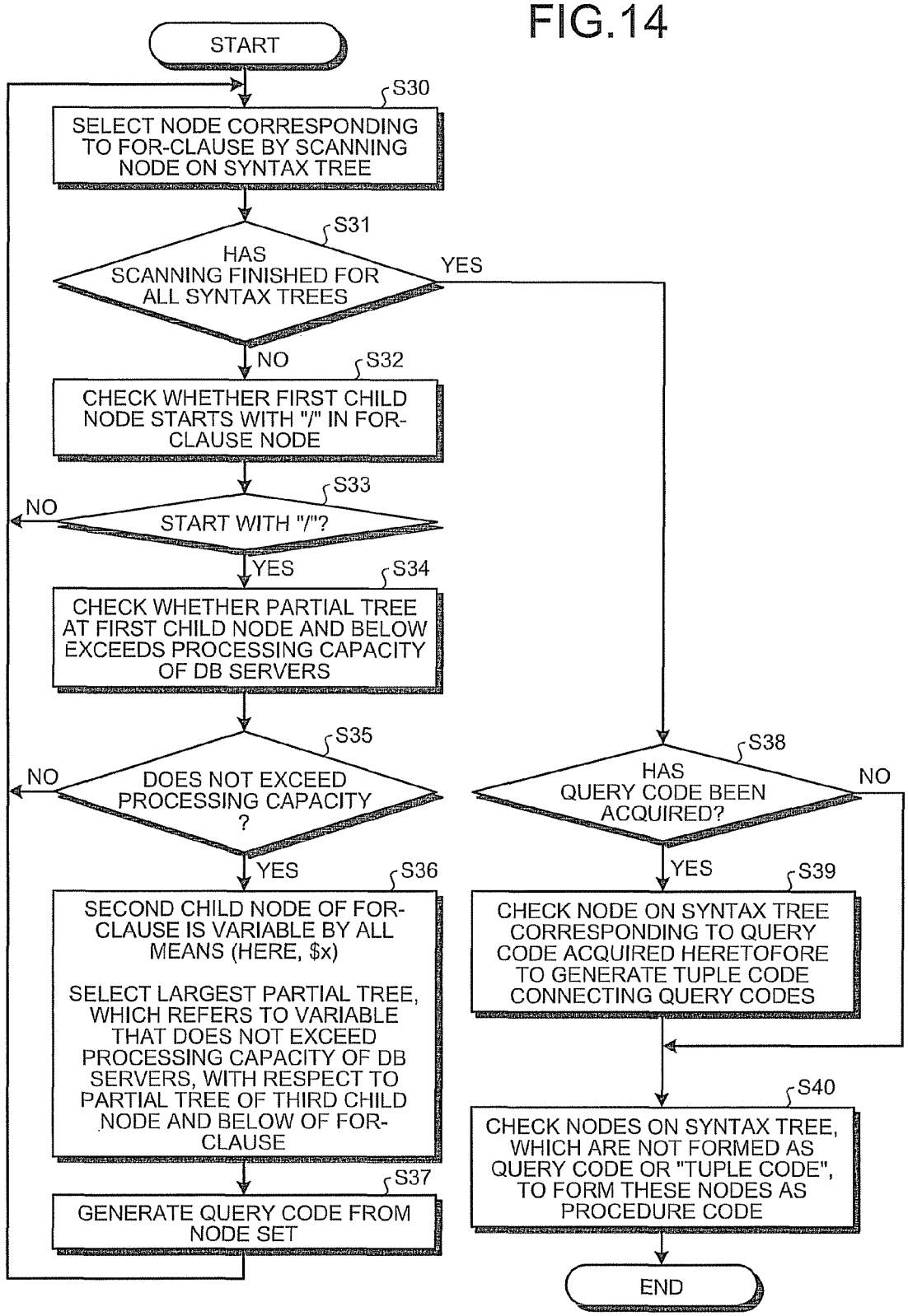
FIG. 14 is a flowchart of a code generation process procedure in which the coordinator server generates various codes at Step S6.
Figure 16:
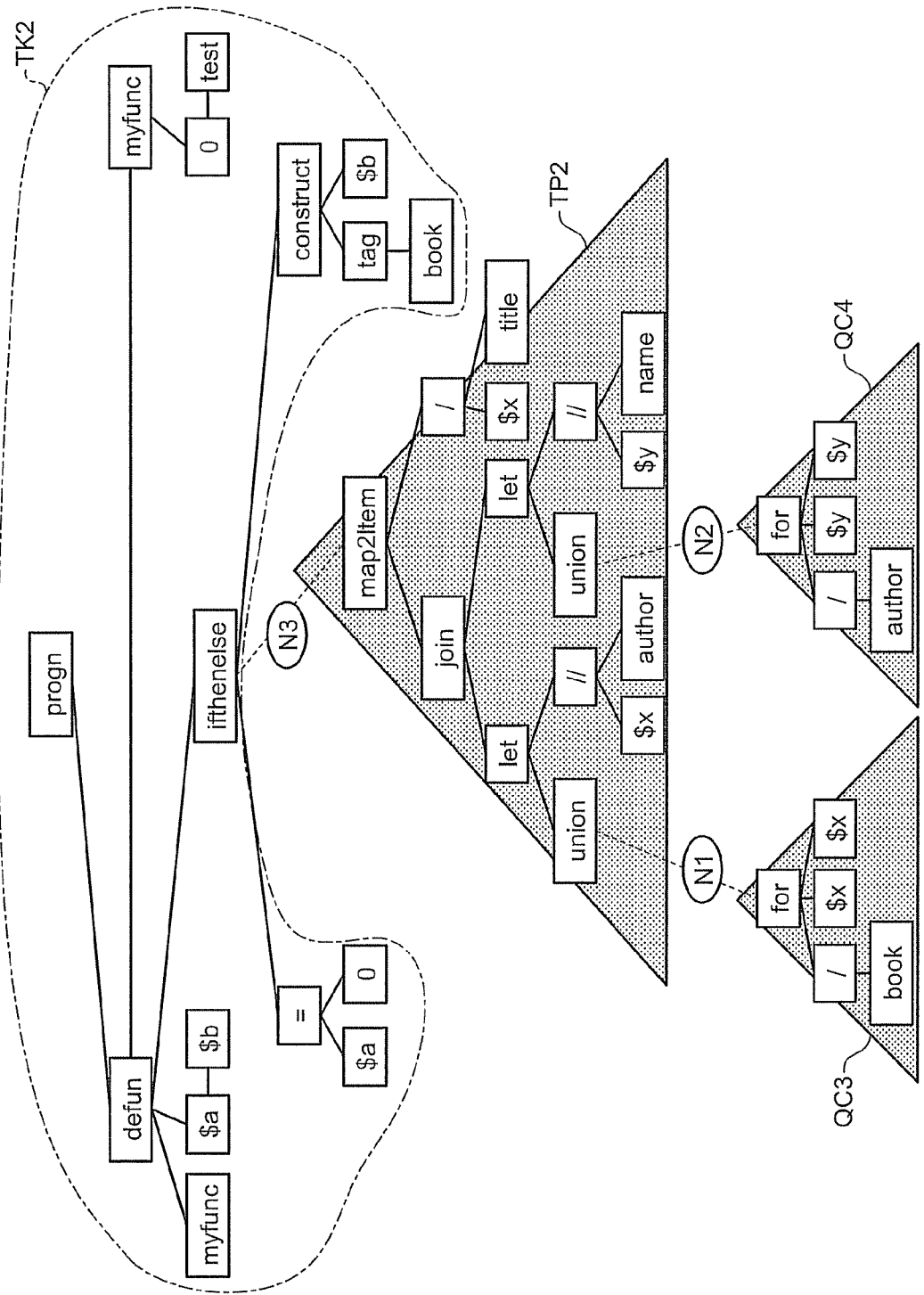
FIG. 16 depicts various codes generated by referring to the processing capacity information shown in FIG. 15.

When the code generator 601 in the coordinator server 60 performs processing at Step S36 in FIG. 14 by referring to the processing capacity information, because the DB servers 70A to 70B cannot process "//", the DB servers 70A to 70B generates ($x//author) not as the query code but as the tuple code. As a result, various codes as shown in FIG. 16 are generated. These various codes are different from those shown in FIG. 8 in that ($x//author) and ($y//name) are generated by the tuple code.

By performing processing according to the combination of the query code, the tuple code, and the procedure code, the XQuery can be processed transparently, using the distributed servers. Accordingly, in the distributed XML database system, the distributed query processing can be realized while maintaining the distribution transparency.

Further, complete distributed XQuery processing can be realized by referring to the processing capacity information of the DB servers 70A to 70B to generate various codes and respectively executing the processing indicated by the various codes. That is, according to the configuration in the present embodiment, the distributed XML database system having an XQuery full support function can be established by using various XML databases, in which XQuery is not fully supported or a support ratio is different.

In the conventional distributed XML database, for example, there are following assumptions.

The database server can solve a complete XQuery specification.

The coordinator server does not have a doubt about the XQuery solving capability of the database server.

In practice, however, the database constituting the distributed XML database cannot always solve the complete XQuery specification. Therefore, when such a distributed XML database performs the distributed XQuery processing, there may be a problem in that a complete processing result cannot be acquired. As described above, such a problem can be solved by the configuration of the present embodiment.

Figure 17:
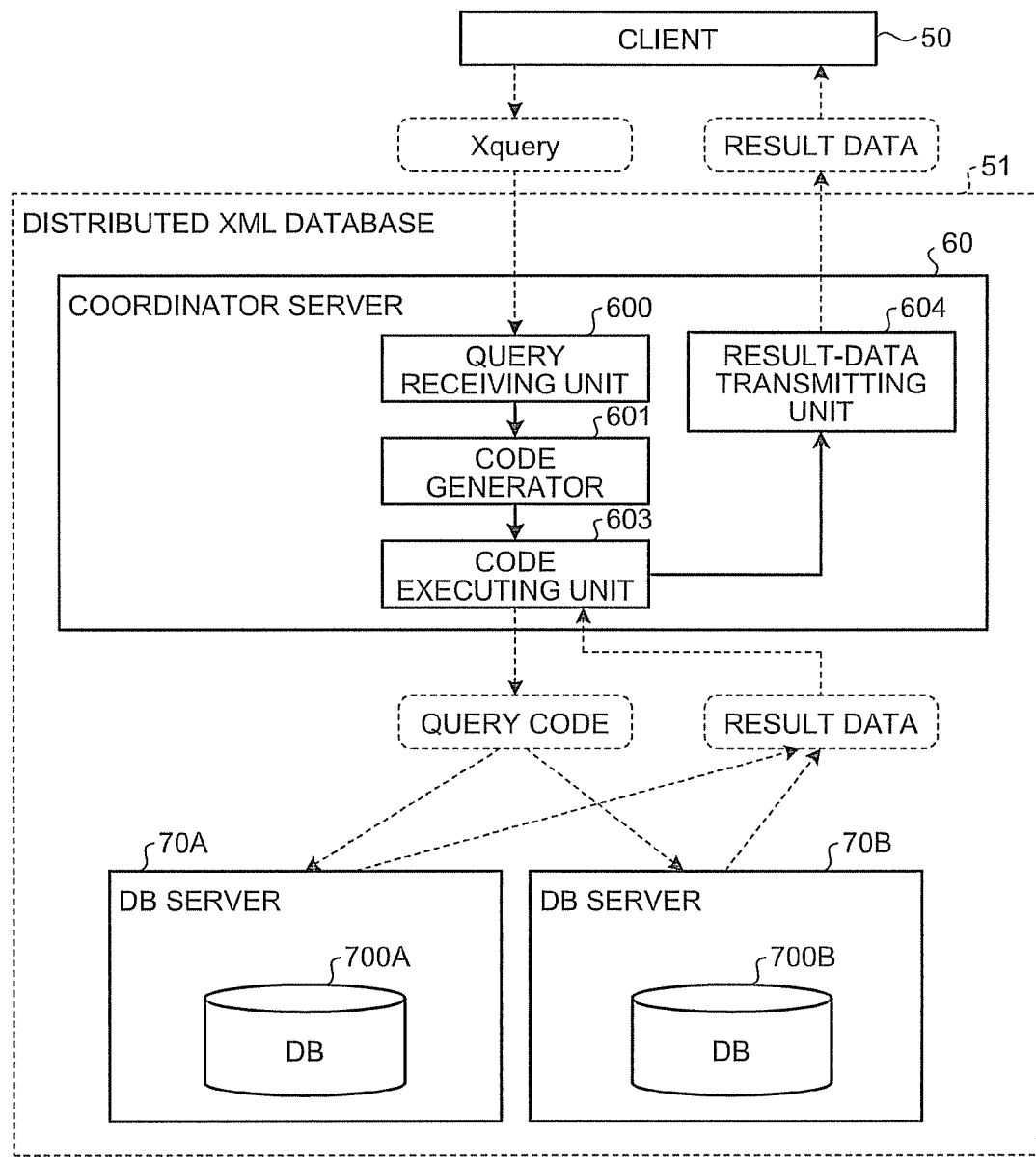
FIG. 17 is an example of a configuration of a distributed XML database system according to a modification of the embodiment.

In the above embodiment, the coordinator server 60 refers to the processing capacity information of the DB servers 70A to 70B, to generate various codes from the query received from the client 50. However, the coordinator server 60 can generate the various codes from the query without referring to the processing capacity information. FIG. 17 is an example of a configuration of a distributed XML database system according to a modification of the above embodiment. As shown in FIG. 17, the distributed XML database system according to the modification is different from that of the above embodiment in that the coordinator server 60 does not include the DB-server processing-capacity managing unit 602. In this configuration, the DB servers 70A to 70B do not transmit the processing capacity information of their own to the coordinator server 60. The operation in such a distributed XML database system is, for example, as described below. In FIG. 13, processes at Step S1 to S3 are not performed, and at Step S6, the coordinator server 60 performs syntax analysis with respect to the query received from the client 50, without referring to the processing capacity information, to generate the query code, the tuple code, and the procedure code.

According to such a configuration, because processing is performed according to the query code indicating the processing performed by each of the DB servers 70A to 70B, and a combination of the tuple code and the procedure code as the codes indicating the processing performed by the coordinator server 60, the XQuery can be processed transparently by using the distributed servers.

Further, while in the above embodiment, the XQuery is used as the query requesting acquisition of the XML data, the embodiment is not limited thereto.

Further, while the coordinator server 60 generates the tuple code and the procedure code as the codes indicating the processing to be performed by using the execution result of the query code, the embodiment is not limited thereto.

In the above embodiment, the coordinator server 60 acquires the processing capacity information when the DB servers 70A to 70B are connected to the distributed XML database server system. However, the present invention is not limited thereto, and the coordinator server 60 can store the processing capacity information in a memory or an external memory beforehand, and use this information at the time of generating the various codes.

In the above embodiment, various programs to be executed by the coordinator server 60 and the DB servers 70A to 70B can be stored on a computer connected to the network such as the Internet, and downloaded via the network. Further, various programs can be recorded on a computer readable recording medium such as a CD-ROM, a flexible disk (FD), a CD-recordable (CD-R), and a digital versatile disk (DVD), and provided in an installable or executable format file.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A coordinator server configured to be connected to a plurality of distributed database servers each having a database for storing extensible markup language data, the coordinator server comprising:

a first receiving unit that receives a query requesting to acquire extensible markup language data satisfying a predetermined condition from a client;

an acquiring unit that acquires processing capacity information indicating a processing capacity of a database server for the query from each of the database servers;

a generating unit that generates a first code indicating a first processing to be performed by each of the database servers, and a second code indicating a second processing to be performed by using an execution result of the first code by referring to the processing capacity information for the query;

a first transmitting unit that transmits the first code to each of the database servers;

a second receiving unit that receives first result data including a part of or all extensible markup language data acquired as a result of executing the first processing from each of the database servers;

an executing unit that executes the second processing indicated by the second code using the first result data;

a second transmitting unit that transmits second result data including a part of or all extensible markup language data acquired as a result of executing the second processing to the client; and a processing unit for executing at least the generating unit, wherein the processing capacity information indicates a syntactic form of the query that can be processed by the database server, and the generating unit includes:

analyzing unit that performs a syntax analysis for the query, a first code generating unit that determines a first syntax portion corresponding to a part of a syntax acquired as a result of the syntax analysis and in a range of the syntactic form indicated by the processing capacity information, and generates the first code for each of the database servers based on the first syntax portion; and a second code generating unit that generates the second code based on a second syntax portion of the syntax other than the first syntax portion.

2. The coordinator server according to claim 1, wherein the first receiving unit receives the query described in XQuery from the client.

3. A coordinator server configured to be connected to a plurality of distributed database servers each having a database for storing extensible markup language data, the coordinator server comprising:

a first receiving unit that receives a query requesting to acquire extensible markup language data satisfying a predetermined condition from a client;

a generating unit that generates a first code indicating a first processing to be performed by each of the database servers, using an execution result of the first code, a tuple code indicating a second processing by a tuple operation and a procedure code indicating a third processing by a procedure operation;

a first transmitting unit that transmits the first code to each of the database servers;

a second receiving unit that receives first result data including a part of or all extensible markup language data acquired as a result of executing the first processing from each of the database servers;

an executing unit that executes the second processing and the third processing by using the first result data; and a second transmitting unit that transmits second result data including a part of or all extensible markup language data acquired as a result of executing the second processing and the third processing to the client; and a processing unit for executing at least an acquiring unit, wherein the acquiring unit acquires processing capacity information indicating a processing capacity of a database server for the query from each of the database servers, wherein the processing capacity information indicates a syntactic form of the query that can be processed by the database server, and the generating unit includes:
  an analyzing unit that performs a syntax analysis for the query
  a first code generating unit that determines a first syntax portion corresponding to a part of a syntax acquired as a result of the syntax analysis and in a range of the syntactic form indicated by the processing capacity information, and generates the first code for each of the database servers based on the first syntax portion;
  a second code generating unit that generates the tuple code based on a second syntax portion of the syntax other than the first syntax portion and capable of performing a tuple operation; and
  a third code generating unit that generates the procedure code based on a third syntax portion of the syntax other than the first and the second syntax portions.

4. The coordinator server according to claim 3, wherein the executing unit includes:
  a tuple executing unit that executes the second processing by using the first result data, and
  a procedure executing unit that executes the third processing by using third result data including a part of or all extensible markup language data acquired as a result of executing the second processing, and
  the second transmitting unit transmits the second result data including a part of or all extensible markup language data acquired as a result of executing the third processing to the client.

5. The coordinator server according to claim 3, wherein the first receiving unit receives the query described in XQuery from the client.

6. A distributed processing method to be executed in a coordinator server connected to a plurality of distributed database servers each having a database for storing extensible markup language data, the distributed processing method comprising:
  receiving a query requesting to acquire extensible markup language data satisfying a predetermined condition from a client;
  acquiring processing capacity information indicating a processing capacity of a database server for the query from each of the database servers;
  generating a first code indicating a first processing to be performed by each of the database servers, and a second code indicating a second processing to be performed by using an execution result of the first code by referring to the processing capacity information for the query;
  transmitting the first code to each of the database servers;
  receiving first result data including a part of or all extensible markup language data acquired as a result of executing the first processing from each of the database servers;
  executing the second processing indicated by the second code by using the first result data;
  transmitting second result data including a part of or all extensible markup language data acquired as a result of executing the second processing to the client; wherein
  the processing capacity information indicates a syntactic form of the query that can be processed by the database server; and
  the generating includes;
    performing a syntax analysis for the query;
    determining a first syntax portion corresponding to a part of a syntax acquired as a result of the syntax analysis and in a range of the syntactic form indicated by the processing capacity information;
    generating the first code for each of the database servers based on the first syntax portion; and
    generating the second code based on a second syntax portion of the syntax other than the first syntax portion.

7. A distributed processing method to be executed in a coordinator server connected to a plurality of distributed database servers each having a database for storing extensible markup language data, the distributed processing method comprising:
  receiving a query requesting to acquire extensible markup language data satisfying a predetermined condition from a client;
  generating a first code indicating a first processing to be performed by each of the database servers, and as a second code indicating a processing to be performed by using an execution result of the first code, a tuple code indicating a second processing by a tuple operation and a procedure code indicating a third processing by a procedure operation;
  transmitting the first code to each of the database servers;
  receiving first result data including a part of or all extensible markup language data acquired as a result of executing the first processing from each of the database servers;
  executing the second processing and the third processing by using the first result data;
  transmitting second result data including a part of or all extensible markup language data acquired as a result of executing the second processing and the third processing to the client;
  acquiring processing capacity information indicating a processing capacity of a database server for the query from each of the database servers, wherein
  the processing capacity information indicates a syntactic form of the query that can be processed by the database server; and
  the generating includes:
    performing a syntax analysis for the query;
    determining a first syntax portion corresponding to a part of a syntax acquired as a result of the syntax analysis and in a range of the syntactic form indicated by the processing capacity information;
    generating the first code for each of the database servers based on the first syntax portion;
    generating the tuple code based on a second syntax portion of the syntax other than the first syntax portion and capable of performing a tuple operation; and
    generating the procedure code based on a third syntax portion of the syntax other than the first and second syntax portions.

* * * * *